Sept. 18, 1956    E. A. NEUGASS    2,763,231
KNOBS

Filed May 11, 1955    2 Sheets-Sheet 1

INVENTOR.
EDWIN A. NEUGASS
BY
ATTORNEY

Sept. 18, 1956

E. A. NEUGASS 2,763,231

KNOBS

Filed May 11, 1955

INVENTOR.
EDWIN A. NEUGASS

BY

ATTORNEY

United States Patent Office 2,763,231
Patented Sept. 18, 1956

2,763,231

KNOBS

Edwin A. Neugass, Poteau, Okla.

Application May 11, 1955, Serial No. 507,681

9 Claims. (Cl. 116—129)

The present invention relates generally to knobs, and more particularly is directed to illuminated knobs for controlling the elements of electronic devices and the like, for example, on aircraft instrument panels.

Knobs of the described character are usually provided with a pointer or index cooperating with a fixed scale or calibration on the associated panel to show the position of the knob, and hence, the condition of the controlled element. However, if the knob is given a substantial axial depth to facilitate the grasping thereof, the pointer or index is frequently obscured by the body of the knob when the latter is viewed along lines forming substantial angles with the axis of the knob. Further, it is necessary that the pointer or index of the knob extend close to the surface of the panel on which the scale or calibration appears, thereby to avoid erroneous reading of the scale due to parallax, and this requirement, in existing knobs, increases the tendency of the body of the knob to hide or obscure the index, particularly when viewed from the side of the knob diametrically opposed to the location of the index.

Accordingly, it is an object of the present invention to provide a knob having a configuration which permits the secure grasping thereof so that it can be used on hard-working controls or detent switches, and wherein an index or pointer arrangement is embodied on the knob so as to be clearly visible, under either ambient or artificial internal illumination, when viewed from any position, even from the side of the knob diametrically opposed to the location of the index.

Another object is to provide a knob having the above characteristics, and wherein the index or pointer arrangement extends close to the base of the knob so that the position thereof relative to a scale or calibration on an associated panel can be accurately read without the possibility of error due to parallax.

A further object is to provide a knob having the above characteristics and adapted to draw its illumination from an associated internally illuminated panel.

In one aspect of this invention, a knob is formed of a core of clear, light-transmitting, preferably plastic material, including a frusto-conical body having a radial skirt at the base or large diameter end of the body and a bar-shaped extension projecting radially along one side of the body, with the outer edge of the bar-shaped extension being substantially in axial alignment with the periphery of the radial skirt. Another extension is provided at the diametrically opposed side of the frusto-conical body and has an inclined or sloping outer edge surface extending from the small diameter or top end of the body substantially to the periphery of the skirt, and the index of the knob is defined by a semi-cylindrical projection extending along the entire length of that sloping outer edge surface.

In one embodiment of the invention, the semi-cylindrical projection has a white opaque coating thereon, and the remainder of the body, with the exception of the base end of the body and the under surface of the skirt, has a translucent white coating covered by an outer, dark colored, preferably black, opaque coating so that the contrast between the latter and the white coating on the index defining semi-cylindrical projection makes the latter highly visible under ambient illumination. Light is admitted to the knob through the uncovered base end of the body thereof, and the white opaque coating on the index defining semi-cylindrical projection has a thin elongated opening exposing the underlying light-transmitting material so that light can escape through said thin elongated opening to define the index under internal illumination.

In another embodiment of the invention, the index defining semi-cylindrical projection is completely covered with a coating of white translucent material so as to be clearly visible under ambient illumination and, when light is admitted to the interior of the knob, as before, such light transilluminates the translucent coating on the index defining projection and renders the index clearly visible under artificial illumination.

Further, a knob embodying this invention has an opening in the coating covering the index defining semi-cylindrical projection at the end of the latter adjacent the small-diameter end of the frusto-conical body so that light escaping from this opening clearly indicates the position of the knob even when the latter is viewed from the side thereof diametrically opposed to the location of the index.

The foregoing, and other objects, features and advantages of the invention will be apparent in the following detailed description and the accompanying drawings of embodiments of the invention which, it is to be understood, are merely exemplary.

Figure 1:
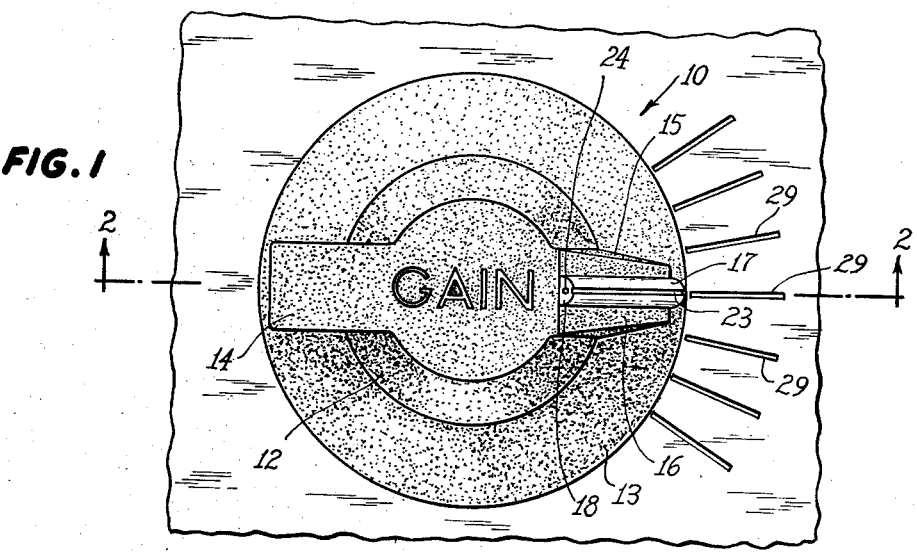
Fig. 1 is a plan view of a knob embodying this invention shown with a portion of an associated panel.

Referring to the drawings in detail, and initially to Figs. 1 to 5, inclusive thereof, it will be seen that a knob embodying the present invention is there illustrated and generally identified by the reference numeral 10. The knob 10 includes a core 11 (Fig. 2) of a light-transmitting preferably plastic material, for example, of the class of acrylic resins or materials, and their polymers and co-polymers, such as, methyl methacrylate. The core 11 includes a frusto-conical body portion 12 having an annular, radially directed skirt 13 projecting from the base or large diameter end thereof, and a radially projecting bar 14 extending along one side of the frusto-conical body portion 12 from the skirt 13 to the plane of the small diameter end of body portion 12, with the radially outer edge surface of the bar 14 being substantially parallel to the axis of the knob 10 and in line with the peripheral edge of the skirt 13.

Figure 3:
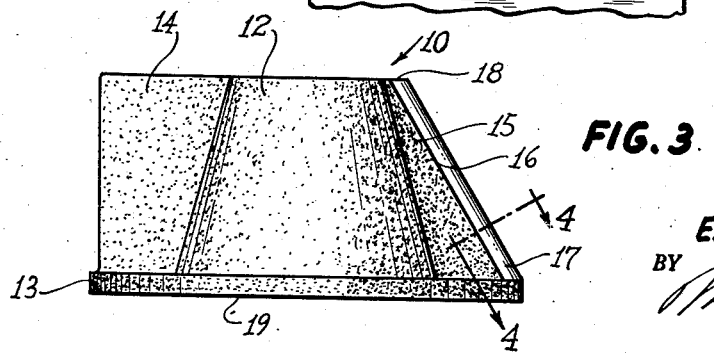
Fig. 3 is a side elevational view of the knob of Figs. 1 and 2.

Further, the body portion 12 of the core 11 has an extension 15 along the body portion 12 at the side of the latter diametrically opposed to the location of the bar 14, and the outer edge surface 16 of the extension 15 slopes or inclines so that, at one end, it is substantially tangential to the small diameter end of body portion 12 and, at its other end, is adjacent to the periphery of the skirt 13 (Figs. 1 and 3). A projection 17 of semi-cylindrical cross-section extends centrally along the entire length of the sloping outer edge surface 16 and, at one end, is cut flush with the small diameter end of body portion 12, as at 18, while the other end of the projection 17 extends at least to the peripheral edge of the skirt 13.

The entire core 11 of the knob 10, with the exception of the back or under surface 19 of the skirt 13, which surface is polished, and the semi-cylindrical surface of the projection 17, is enclosed by a coating 20 (Fig. 2) of light reflecting material so that any light admitted to the light-transmitting core 11 through the polished surface 19 is reflected back into the core wherever such light impinges against the surface of the core covered by the coating 20. The coating 20 may be formed of a translucent, light colored, for example, white, material, such as, materials of the class of polyvinyl or vinyl resins, for example, polyvinyl chloride, vinyl chloride-acetate co-polymers, polyvinyl-idene chloride, and vinyl chloride-vinylidene chloride copolymers, for a purpose hereinafter indicated in detail. A dark colored, preferably black, opaque coating 21 (Fig. 2) is superposed on the coating 20 and may have a matte finish so that the outer surface of the knob will be non-reflective or of low specular gloss. The opaque coating 21 may be formed of any of the materials mentioned in connection with the coating 20, and both coatings may be applied in the form of paints which are successively brushed, sprayed or otherwise applied to the core 11.

The semi-cylindrical projection 17, including the end surface 18 thereof, is covered by an opaque white coating 22 which contrasts sharply with the dark, preferably black, coloration of the remainder of the visible surface of the knob formed by the coating 21 and thereby defines the index of the knob when the latter is viewed in daylight or other ambient illumination. If the light reflecting coating 20 is also opaque, the coating 22 on the projection 17 can be applied at the same time as the coating 20 and merely form an exposed extension of the latter coating.

In order to define the index of the knob 10 when the latter is internally illuminated by light admitted through the bare polished surface 19, the coating 22 is interrupted along a slender elongated area to form a slot 23 (Figs. 1, 2 and 4) extending centrally along the projection 17 from end to end of the latter and through which the underlying light-transmitting material of the core 11 is exposed. Thus, light will escape from the core 11 through the slot 23 to brightly illuminate the latter. Further, an opening 24 (Figs. 1, 2 and 5) is preferably formed in the portion of coating 22 covering end face 18 of the projection 17 and there also exposes the underlying light-transmitting material of the core so that light will escape from the core 11 through the opening 24.

When the coating 20 is formed of a translucent material, as mentioned above, identifying markings and the like capable of being illuminated by light admitted to the core 11 can be defined on the small diameter end of the body portion 12, or elsewhere on the knob, by interrupting the outer opaque coating 21 in a suitable pattern so that the exposed underlying portions of the coating 20 define the desired markings. By reason of the contrast between the exposed portions of the white coating 20 and the surrounding portions of the black outer coating 21, which form a background, the markings defined by the exposed portions of coating 20 will be clearly visible in daylight or other ambient illumination and, when light is admitted to the core 11, such light transilluminates the translucent coating 20 at the exposed portions of the latter to provide glare-free illumination of the corresponding markings.

Figure 2:
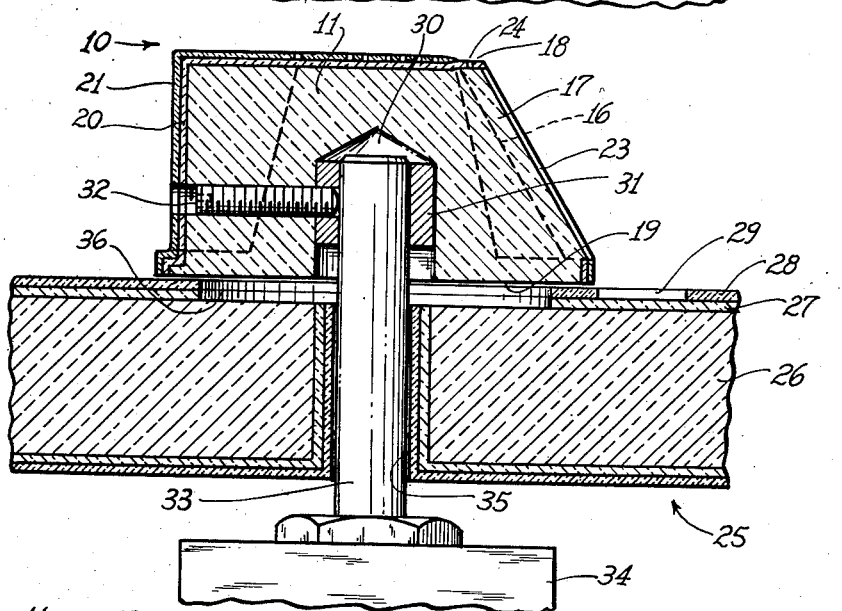
Fig. 2 is a sectional view taken along the line 2—2 of Fig. 1.

In order to admit light to the core 11 through the surface 19 of the latter, the knob 10 is preferably associated with an internally illuminated panel, for example, a panel of the type that is described and illustrated in United States Letters Patent No. 2,518,726, issued August 15, 1950 to Charles N. Shlenker. As seen in Fig. 2, a panel of that type, generally identified by the reference numeral 25, includes a light-transmitting core 26, a white translucent layer 27 superposed on at least the front surface of the core 26, and a black opaque layer 28 superposed on the layer 27 and having openings 29 therein to expose underlying portions of the translucent layer in the form of desired markings, indicia or the like, and so that, when light is admitted to the core 26 from a suitable source (not shown), the exposed portions of the translucent layer 27 are transilluminated to clearly define the openings 29 forming the markings and the like.

As seen in Fig. 2, the knob 10 has an axial, blind bore 30 opening at the center of the surface 19 and accommodating a metal bushing 31 which has a press fit within the bore 30. At least one set screw 32 is threaded into radially aligned, tapped bores in the core 11 and bushing 31 of the knob and acts to secure the latter on a shaft 33 extending from the device 34 to be controlled or actuated by the knob. The device 34 is suitably supported in back of the panel 25, and the shaft 33 extends forwardly through a suitable opening 35 provided in the panel so that the free end of the shaft can be received in the bushing 31. In order to admit light into the core 11 of knob 10 from the panel 25, the layers 27 and 28 of the latter are removed in an annular area 36 covered by the skirt 13 of the knob, whereby light escapes from the core 26 at the area 36 and there enters the core 11 of the knob through the polished surface 19.

Figure 5:
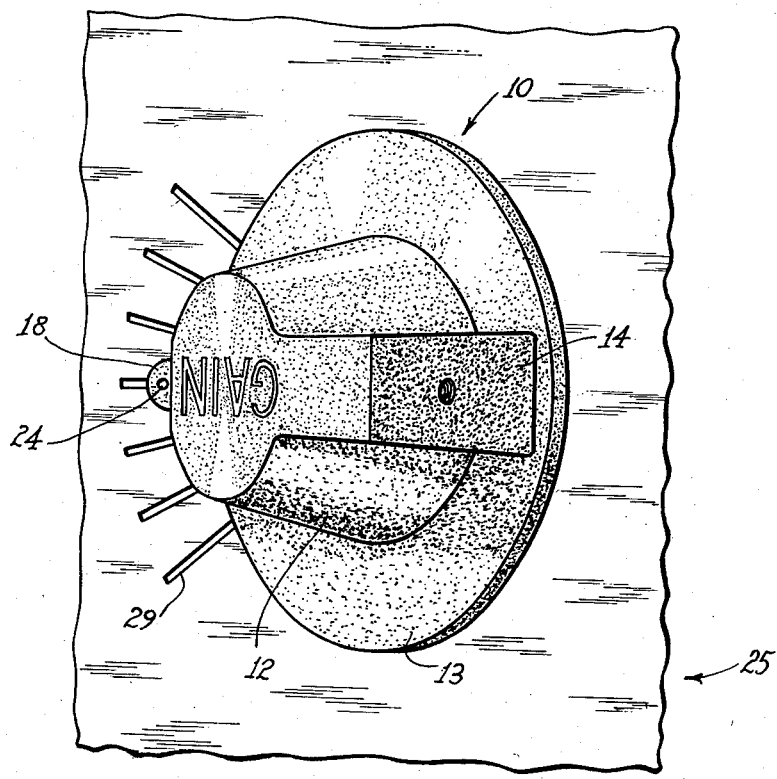
Fig. 5 is a perspective view of the knob of Figs. 1–4.
Figure 4:
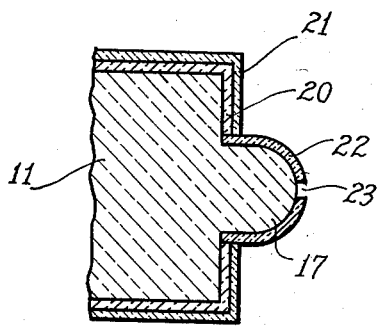
Fig. 4 is a fragmentary sectional view taken along the line 4—4 of Fig. 3, but on an enlarged scale.

The configuration of the knob 10, specifically the provision of the thick bar 14 thereon, permits the firm grasping of the knob to facilitate the turning of the latter even when the knob is used to control or actuate a hard to turn device, for example, a detent switch, valve or the like. Although the knob 10 can be firmly grasped, the configuration thereof is such that its position, and hence the condition of the related device 34, can be readily determined by viewing the relationship of the index of the knob to a scale or calibration defined on the panel 25 by the openings 29 in the layer 28 of the panel, even when the knob is viewed along lines forming substantial angles with the axis of the knob. Since the index defining projection 17 extends to the periphery of the skirt 13 and is, therefore, closely adjacent to the surface of the panel 25, there is no possibility that an error may arise in reading the relationship of the index to the scale or calibration by reason of parallax. Further, the definition of the index by the projection 17 which is raised from the inclined surface 16 ensures that, for most rotated positions of the knob and for most locations from which the knob may be viewed, the length of the projection 17 will be visible to the viewer and not obscured by the frusto-conical body portion 12 of the knob. However, in those few positions of the knob where the length of the projection 17 is not visible, for example, as illustrated in Fig. 5, when the index is located at the side of the knob which is diametrically away from the viewer, the end face 18 of the projection and the opening 24 will still be in view to clearly define the position of the knob under either ambient illumination or internal illumination, respectively.

Figure 6:
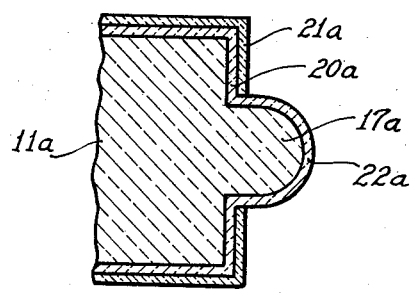
Fig. 6 is a view similar to Fig. 4, but showing another embodiment of the invention.

Although the knob 10 described in connection with Figs. 1 to 5, inclusive, has a white opaque coating 22 on the projection 17 to define the index in daylight and the slot 23 and opening 24 define the index under internal illumination, as seen in Fig. 6, a knob embodying this invention can have a white, translucent coating 22a covering the projection 17a thereof and contrasting with the black, opaque outer layer 21a which is superposed on the reflecting, preferably translucent, white layer 20a covering the core 11a. When the knob of Fig. 6 is viewed in daylight, the white translucent coating 22a defines the index, and when light is admitted to the core 11a, in the manner described in connection with the knob of Figs. 1 to 5, the translucent coating 22a is transilluminated to again define the index so that there is no need to interrupt that coating as the coating 22 is interrupted at 23 and 24. It is to be noted that the knob of Fig. 6 is similar to the knob 10 described in detail above with the exception of the differences mentioned specifically herein.

From the foregoing it is apparent that knob embodying this invention combine ease of manipulation with improved visibility of the indices thereof both in daylight or other ambient illumination and when internally illuminated so that the positions of such knobs can be readily established without regard to the positions from which the knobs are viewed.

Although illustrative embodiments of the invention have been described in detail and shown in the accompanying drawings, it is to be noted that the invention is not limited to those embodiments, and that various changes and modifications may be effected therein without departing from the scope or spirit of the invention as defined in the appended claims.

What is claimed is:

1. A knob of the described character comprising a body portion having an axial bore opening at one end and adapted to receive a shaft which is to be actuated by the knob, a radially directed bar extending axially along one side of said body portion and adapted to be grasped for manual turning of the knob, a radially directed extension along said body portion at the side of the latter diametrically opposed to said bar and having a sloping radially outer edge surface which inclines away from the axis of rotation of the knob in the direction toward said one end of the body portion, and a projection extending centrally from said sloping surface of the extension along the entire length of said extension, the surface of said projection and at least the adjacent portions of the remainder of the surface of said knob being of contrasting colors so that said projection defines an index on the knob when the latter is viewed under ambient illumination.

2. A knob of the described character comprising a body portion having an axial bore opening at the base end and adapted to receive a shaft which is to be actuated by turning of the knob, a radially directed bar extending axially along one side of said body portion and adapted to be grasped for manual turning of the knob, a radially directed extension along the body portion at the side of the latter diametrically opposed to said bar and having a sloping radially outer surface which inclines away from the axis of the knob in the direction toward said base end of the knob, a projection extending centrally from said sloping surface along the entire length of said extension, said body portion, bar, extension and projection being formed of a light-transmitting material defining a core of the knob, a coating of light reflecting material covering the surface of said core with the exception of said base end of the body portion and the surface of said projection, a coating of a dark opaque material superposed on said light reflecting coating, and a coating of a light colored, opaque material covering said projection and having an elongated opening disposed centrally along said projection to expose the underlying light-transmitting material of the projection, whereby light admitted to said core at said base end of the body portion escapes from the core at said elongated opening which thereby defines an index on the knob, while the contrast between said coating of dark opaque material and said coating of a light colored, opaque material causes the latter to define an index on said projection when viewed under ambient illumination.

3. A knob of the described character comprising a body portion having an axial bore opening at the base end and adapted to receive a shaft which is to be actuated by turning of the knob, a radially directed bar extending axially along one side of said body portion and adapted to be grasped for manual turning of the knob, a radially directed extension along the body portion at the side of the latter diametrically opposed to said bar and having a sloping radially outer surface which inclines away from the axis of the knob in the direction toward said base end of the knob, a projection extending centrally from said sloping surface along the entire length of said extension, said body portion, bar, extension and projection being formed of a light-transmitting material defining a core of the knob, a coating of light reflecting material covering the surface of said core with the exception of said base end of the body portion and the surface of said projection, a coating of a dark opaque material superposed on said light reflecting coating, and a coating of a light colored, opaque material covering said projection and having an elongated opening disposed centrally along said projection and an opening at the end of said projection radially closest to the said axis of the knob to there expose the underlying light-transmitting material of the projection; whereby light admitted to said core at the base end of the body portion escapes from the core at said openings which thereby define an index on the knob, while the color contrast between said coatings on said projection and on the remainder of the knob causes said projection to define the index under ambient illumination.

4. A knob of the described character comprising a body portion of frusto-conical configuration having a radially directed annular skirt at the base end thereof, a radially directed bar extending axially along said body portion from said skirt to the relatively small end of the body portion and adapted to be grasped for effecting manual turning of the knob, a radially directed extension along said body portion from said skirt to said small end and at the side of the body portion diametrically opposed to said bar, said extension having a radially outer edge surface sloping with respect to the axis of the knob from said small end of the body portion to the periphery of said skirt on the latter, a projection extending centrally from said sloping surface along the length of the latter, and coatings of contrasting colors on said projection and on substantially the remainder of the exposed surface of said knob so that said projection defines an index on the knob when viewed under ambient illumination.

5. A knob of the described character comprising a body portion of frusto-conical configuration having a radially directed annular skirt at the base end thereof, a radially directed bar extending axially along said body portion from said skirt to the relatively small end of the body portion and adapted to be grasped for effecting manual turning of the knob, a radially directed extension along said body portion from said skirt to said small end and at the side of the body portion diametrically opposed to said bar, said extension having a radially outer edge surface sloping with respect to the axis of the knob from said small end of the body portion to the periphery of said skirt on the latter, a projection extending centrally from said sloping surface along the length of the latter, said body portion, bar, extension and projection being formed of a light-transmitting material defining a core of the knob, a first coating of light reflecting material covering the surface of said core with the exception of said base end of the body portion and said projection, an outer coating of dark opaque material superposed on said first coating, and a coating of light colored material covering said projection to contrast with said outer coating of dark opaque material and, thereby, to define an index on the knob when the latter is viewed under ambient illumination.

6. A knob according to claim 5; wherein said coating covering said projection is opaque and has at least an elongated opening extending along the entire length of said projection to expose the underlying light-transmitting material so that light admitted to said core at the bare base end of the body portion escapes from the core at said elongated opening to define the index under internal illumination.

7. A knob according to claim 6; wherein said coating covering said projection has a further opening facing axially at the end of said projection adjacent said small end of the body portion and through which light can also escape from said core to define the location of the index when the knob is viewed from locations at the side of the knob diametrically opposed to said projection.

8. A knob according to claim 5; wherein said coating covering the projection is translucent so that light admitted to said core will transilluminate said translucent coating and thereby provide glare-free illumination at said index defining projection.

9. A knob according to claim 5; wherein said first coating is translucent and light colored and said opaque, dark outer coating is interrupted to expose portions of said first coating in the form of markings, whereby said markings are visible under ambient illumination by reason of the color contrast between said outer opaque coating and said first coating and so that light admitted to said core at said base end of the body portion transilluminates said exposed portions of the first coating to provide glare-free illumination of said markings.

References Cited in the file of this patent

UNITED STATES PATENTS

| 2,602,036 | Sullivan | July 1, 1952 |
| 2,682,251 | Neugass | June 29, 1954 |